(12) United States Patent
Veilleux, Jr. et al.

(10) Patent No.: US 10,527,038 B2
(45) Date of Patent: Jan. 7, 2020

(54) FUEL FLOW CONTROL ASSEMBLY OF AIRCRAFT ENGINE AND METHOD

(71) Applicant: HAMILTON SUNDSTRAND CORPORATION, Charlotte, NC (US)

(72) Inventors: Leo J. Veilleux, Jr., Wethersfield, CT (US); Lubomir A. Ribarov, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 71 days.

(21) Appl. No.: 15/411,370

(22) Filed: Jan. 20, 2017

(65) Prior Publication Data
US 2018/0209419 A1 Jul. 26, 2018

(51) Int. Cl.
| | |
|---|---|
| *F04C 29/00* | (2006.01) |
| *F04C 18/16* | (2006.01) |
| *F16C 32/00* | (2006.01) |
| *F04C 15/00* | (2006.01) |
| *F04C 14/00* | (2006.01) |
| *F01D 25/16* | (2006.01) |
| *F01D 25/18* | (2006.01) |
| *F04C 2/18* | (2006.01) |
| *F02C 7/22* | (2006.01) |
| *F02C 9/26* | (2006.01) |

(Continued)

(52) U.S. Cl.
CPC ............ *F04C 14/00* (2013.01); *F01D 25/166* (2013.01); *F01D 25/18* (2013.01); *F02C 7/22* (2013.01); *F02C 9/263* (2013.01); *F04C 2/14* (2013.01); *F04C 2/18* (2013.01); *F04C 13/00* (2013.01); *F04C 15/0026* (2013.01); *F04C 2210/203* (2013.01); *F04C 2240/54* (2013.01); *F05D 2240/53* (2013.01); *Y02T 50/671* (2013.01)

(58) Field of Classification Search
CPC ...... F04C 14/00; F04C 18/16; F04C 15/0088; F01D 25/166; F01D 25/18; F16C 32/0666; F16C 32/0659; D04C 29/0021
USPC .......................... 418/98, 73, 87, 191, 196, 1
See application file for complete search history.

(56) References Cited

U.S. PATENT DOCUMENTS

| | | | | | |
|---|---|---|---|---|---|
| 2,504,230 | A | * | 4/1950 | Smith | ................... F04C 13/001 15/207.2 |
| 2,891,483 | A | * | 6/1959 | Murray | ................... F01C 21/02 418/80 |

(Continued)

FOREIGN PATENT DOCUMENTS

EP 1048842 A2 11/2000

OTHER PUBLICATIONS

Search Report regarding related EP App. No. 18152126.1; dated May 24, 2018; 8 pgs.

*Primary Examiner* — Deming Wan
(74) *Attorney, Agent, or Firm* — Cantor Colburn LLP

(57) ABSTRACT

A fuel flow control assembly for an aircraft engine. The assembly includes a gear arrangement having a shaft. Also included is a bearing structure operatively coupled to each shaft. Further included is a pressure pad disposed adjacent the bearing structure, the pressure pad having a radially extending port for receiving a fuel flow. Yet further included is a flow metering device in flow communication with the port of the pressure pad to restrict the fuel flow at a low pressure operating condition and open the port to increase the fuel flow at a high pressure operating condition.

17 Claims, 2 Drawing Sheets

(51) Int. Cl.
*F04C 2/14* (2006.01)
*F04C 13/00* (2006.01)

(56) References Cited

U.S. PATENT DOCUMENTS

| | | | | |
|---|---|---|---|---|
| 4,909,714 | A * | 3/1990 | Cheng | F04C 2/086 |
| | | | | 418/132 |
| 5,339,776 | A * | 8/1994 | Regueiro | F01M 1/16 |
| | | | | 123/196 AB |
| 8,123,493 | B2 * | 2/2012 | Yoshimura | F04B 39/04 |
| | | | | 418/98 |
| 9,366,287 | B2 * | 6/2016 | Nishioka | F16C 32/0659 |
| 9,488,174 | B2 * | 11/2016 | Kovach | F04C 15/0042 |
| 2002/0050140 | A1 | 5/2002 | Blot-Carretero et al. | |
| 2009/0208357 | A1 * | 8/2009 | Garrett | F04C 2/18 |
| | | | | 418/152 |
| 2012/0207634 | A1 * | 8/2012 | Heger | F04C 18/16 |
| | | | | 418/1 |
| 2013/0269365 | A1 * | 10/2013 | Clements | F02C 7/06 |
| | | | | 60/783 |
| 2014/0105773 | A1 * | 4/2014 | Tychsen | F04C 29/0021 |
| | | | | 418/1 |
| 2015/0330519 | A1 * | 11/2015 | Maurer | F16K 11/04 |
| | | | | 137/565.26 |

* cited by examiner

FUEL FLOW CONTROL ASSEMBLY OF AIRCRAFT ENGINE AND METHOD

BACKGROUND

Exemplary embodiments pertain to the art of fuel supply systems for aircraft engines and, more particularly, to a fuel metering and fuel supply assembly for such systems, as well as a method.

Aircraft gas turbine engines receive pressurized fuel from fuel gear pumps. The gear pump must be compact, lightweight and robust. The gear pump must perform over a wide operational range while providing critical fuel flows and pressures for various engine performance functions. Typically, these gear pumps receive rotational power from an accessory gearbox through an input drive shaft. Such gear pumps are arranged in a dual stage comprising a driving gear and a driven gear. The rotational power from the input shaft is transferred from one stage to the other stage through the driven gear and its coupling shaft. Each gear stage contains gears supported by journal bearings. The load of the gear shafts is supported by journal bearings operating on both the hydrostatic pressure and the hydrodynamic pressure from a thin film of fluid (i.e. fuel) between the rotating and the stationary journal bearings. The journal bearings are inserted into a common carrier, often cast as one piece. The gear bearing face geometry provides a bridge land and is sculpted so that it minimizes fuel cavitation and pressure ripple which may deteriorate the integrity of the pump components.

The trend is for higher fuel pressures and higher fuel temperatures with modern highly efficient high bypass ratio engines. This has forced the need for the use of hybrid pressure pads for fuel gear pumps to meet journal bearings load requirements. Hybrid pressure and cooling pads are used to significantly reduce the journal bearings size and weight of the gear pump's bearings by increasing load carrying capability through an increased fluid (i.e. fuel) film thickness. However, this is achieved at the expense of parasitic pump fuel flow output loss at cranking conditions, resulting in low (e.g., insufficient) fuel flow output at low rotational speeds of the gear pump such as start and windmill start or significantly larger pumps to accommodate this loss.

BRIEF DESCRIPTION

Disclosed is a fuel flow control assembly for an aircraft engine. The assembly includes a gear arrangement having a shaft. Also included is a bearing structure operatively coupled to each shaft. Further included is a pressure pad disposed adjacent the bearing structure, the pressure pad having a radially extending port for receiving a fuel flow. Yet further included is a flow metering device in flow communication with the port of the pressure pad to restrict the fuel flow at a low pressure operating condition and open the port to increase the fuel flow at a high pressure operating condition.

Also disclosed is a method of managing fuel flow for an aircraft engine. The method includes regulating a fuel flow with a fuel metering device, the fuel flow provided from a fuel supply to a radially extending port of a pressure pad disposed adjacent a bearing structure. The method also includes restricting the fuel flow with the fuel metering device at a low pressure operating condition. The method further includes opening the port with the fuel metering device to increase the fuel flow at a high pressure operating condition.

Further disclosed is a fuel flow control assembly for an aircraft engine that includes a gear arrangement having a shaft. Also included is a floating bearing disposed adjacent a face of a gear of the gear arrangement. Further included is a pressure pad disposed adjacent the floating bearing, the pressure pad having a radially extending port for receiving a fuel flow. Yet further included is a flow metering assembly in flow communication with the port of the pressure pad to restrict the fuel flow at a low pressure operating condition and open the port to increase the fuel flow at a high pressure operating condition.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
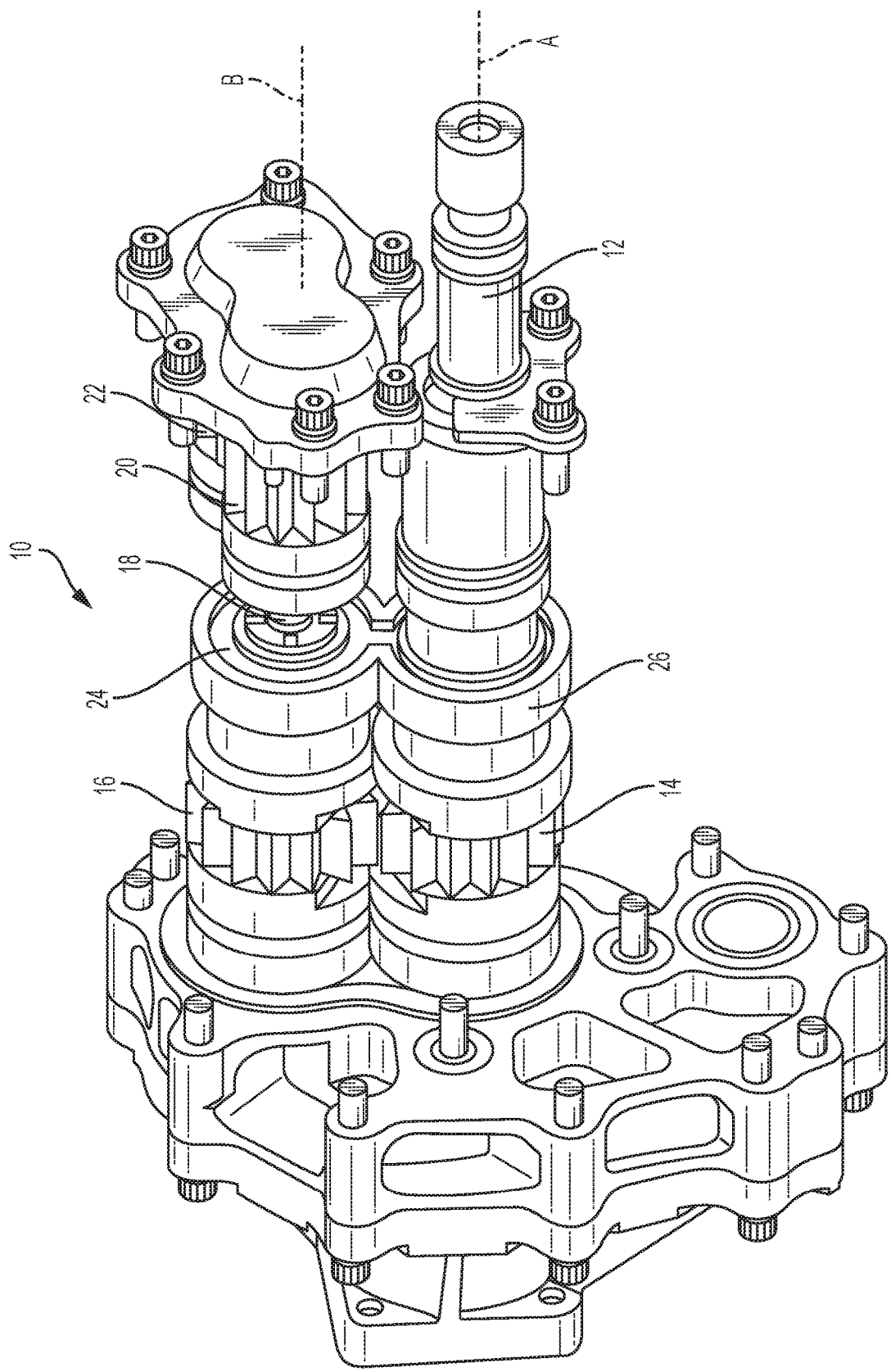
FIG. 1 is a perspective view of a fuel gear pump assembly.

Referring to FIG. 1, a fuel gear pump assembly 10 is shown with a housing removed for illustrative purposes. The illustrated fuel gear pump assembly 10 is a dual stage gear arrangement for use in conjunction with a fuel supply system for an aircraft engine. However, it is contemplated that fuel supply systems for other applications may benefit from the embodiments described herein. Although a two stage gear arrangement is illustrated and described herein, it is to be appreciated that the embodiments described herein may be incorporated into other multi-stage arrangements or a single stage arrangement.

The fuel gear pump assembly 10 provides fuel flows and pressures for various engine performance functions. The fuel gear pump assembly 10 includes an input drive shaft 12 (e.g., first shaft) that is rotatable around axis A. The rotational power from the input shaft 12 is transferred from one stage to another stage via a meshed relationship of multiple gears. In particular, a drive gear 14 (also referred to herein as a "first gear") is operatively coupled to the input drive shaft 12 and is in meshed engagement with a driven gear 16 (also referred to herein as a "second gear") that is operatively coupled to a second shaft 18 that is rotatable around axis B. Also operatively coupled to the second shaft 18 is a motive drive gear 20 that is in meshed engagement with a motive driven gear 22.

The drive gear 14 and the driven gear 16 are supported by bearings 24 that are operatively coupled to each shaft 12, 18 and fixed relative to a housing (not shown). The bearings 24 are inserted into a common carrier 26 that is cast as one piece in a general shape of an "8" in some embodiments. Highly efficient, high bypass aircraft engines typically require high fuel pressures and high fuel temperatures. In such engines, hybrid pressure pad(s) are employed to meet journal bearing load requirements, as pressure and cooling pads significantly reduce the journal size and weight of the gear pump's bearings by increasing load capability. For example, this can be achieved by supplying high-pressure fluid (i.e. fuel) to form a hybrid pad at a location annularly between the inner surface of the journal bearing and the corresponding gear shaft. This applies to both drive and driven gear shafts. The formed hybrid pad provides a high-pressure fluid (i.e. fuel) film with increased thickness which, in turn, can support higher loads from the gear shaft.

The embodiments described herein provide pump flow control to journal bearings to turn off fuel supply at pump cranking and turn on fuel supply at higher pressure conditions where additional film cooling and film lift is required. Pump journal flow control can also be optionally deployed to hybrid pads (also referred to as "pressure pad" herein and shown in FIG. 3) of floating bearings with the use of a flow metering assembly that is in flow communication with the radially extending port of the pressure pad. The fixed and floating bearings are located adjacent to the face of a gear of the gear arrangement. Transfer tubes or alternative suitable sealing structures or devices may be employed to port the metered fuel supply. This allows the floating bearings to receive the control flow and still float against a gear face. The fixed bearings do not require floating because they are loaded into to the housing structure, whereas the floating bearings are spring- and pressure-loaded into the face of the gears and thereby loading the gears into the fixed bearings. The flow metering assembly is in flow communication with the port of the pressure pad to restrict the fuel flow at a low pressure operating condition and open the port to increase the fuel flow at a high pressure operating condition.

Figure 2:
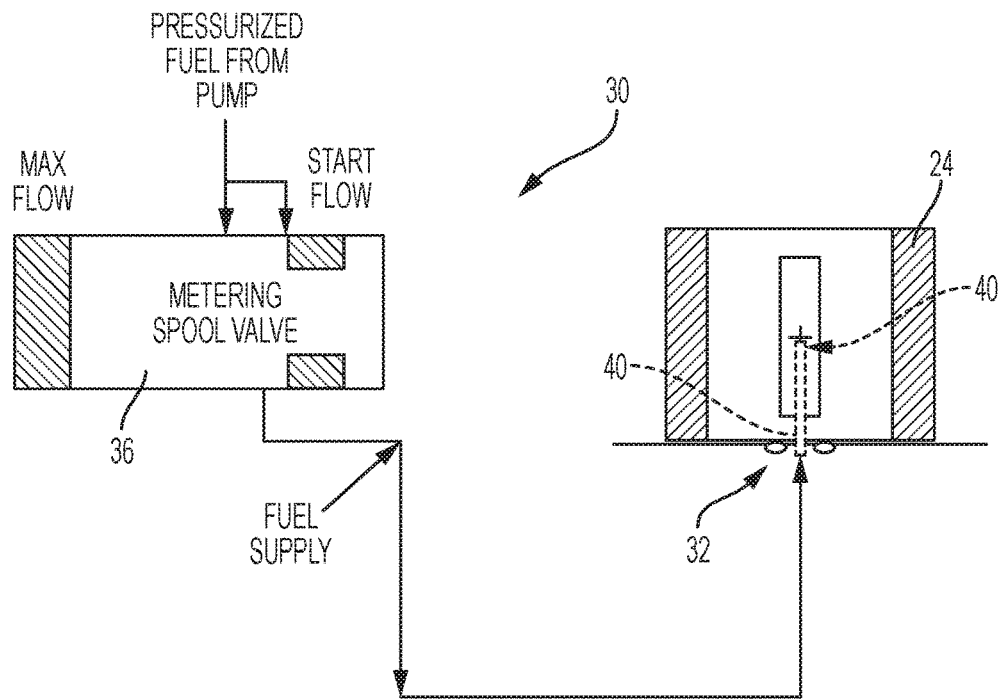
FIG. 2 is a schematic illustration of a fuel supply control system.
Figure 3:
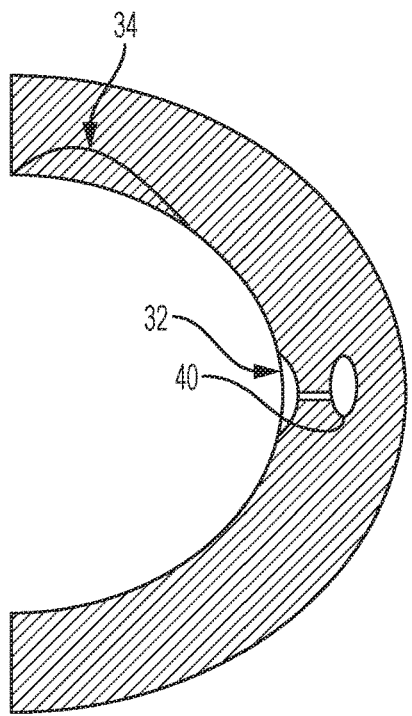
FIG. 3 is a side, cross-sectional view of a hybrid pressure pad of the fuel supply control system.

Referring to FIGS. 2 and 3, a fuel supply control system 30 is schematically represented (FIG. 2). The fuel supply control system 30 includes a pressure pad 32 (FIG. 3) disposed adjacent the bearings 24. The pressure pad 32 provides characteristics of pad pressure and fuel flow that is only required at high pressure conditions which correspond to high rotational speed of the gear fuel pump. This allows the gear fuel pump to build up enough pressure to restart the engine in flight during a windmill start operation or a typical startup operation. The control shuts off the fuel flow to the pump's fixed bearings during critical low speed operational modes (e.g., low rotor speed windmill engine restart). A low pressure fluid groove 34 provides fluid (i.e., fuel) for all conditions located in advance of a journal load location. A high pressure pad is located in advance of a high load journal location. The high pressure pad bearing flow is turned on and off (or anywhere in between) with a flow metering device 36 without additional controls. In some embodiments, the flow metering device 36 is a metering spool valve. Alternatively, the flow metering device 36 is a solenoid, pneumatically controlled valve, or a mechanically controlled valve. Any suitable flow modulating device may be employed.

As shown, the flow metering device controls closure and opening of a port 40 that extend radially through the pressure pad 32. The port 40 is opened at high fuel pressures, thus providing necessary fuel pressure and cooling, while leaving the port 40 closed during low pressure operating conditions to avoid parasitic pump fuel flow output loss that would otherwise occur at such conditions. The metering device 36 can be connected to an engine's onboard electronic control system (i.e. EEC/FADEC) thus receiving inputs related to engine speed, fuel flow demand, fuel temperature and pressure, as well as ambient air conditions, such as (but not limited to): altitude, pressure, temperature, density, etc. Based on these inputs, the flow metering device 36 can be commanded to switch between ON and OFF (or anywhere in between) positions, thus providing optimal fuel supply to the gear pump's journal bearings. This precise fuel flow metering reduces wasteful fuel delivery and/or consumption and maintains the fuel's temperature at lower temperatures, thus increasing the fuel's capabilities as an on-board heat sink.

Advantageously, wasteful fuel leakage past hydrostatic pads of fuel pump gear bearings is reduced or eliminated. Additionally, the size of the pump is reduced, thus reducing the pump's weight and avoiding excess heat generation of the fuel. The fuel's capability as an onboard heat sink is also extended due to the avoidance of excess heat generation. The embodiments described herein also provide adequate capability for windmill engine restart.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A dual stage fuel gear pump assembly for an aircraft engine comprising:
    a gear arrangement having a plurality of gears disposed on a respective plurality of shafts including a drive gear disposed on a first shaft and a driven gear disposed on a second shaft;
    a bearing structure comprising a plurality of journal bearings, one bearing of the plurality of journal bearings operatively coupled to one shaft of the plurality of shafts and another bearing of the plurality of journal bearings operatively coupled to another shaft of the plurality of shafts, the plurality of journal bearings inserted into a common carrier to form an "8" shape, the one bearing configured to float against the one shaft and including:
    an annular inner surface and an annular outer surface;
    a pressure pad disposed on the annular inner surface adjacent the bearing structure, the pressure pad having a radially extending port for receiving a fuel flow, the radially extending port extending partially toward the annular outer surface to a radial location intermediate the annular inner surface and the annular outer surface;
    a flow metering device comprising a valve in fluid communication with the radially extending port of the pressure pad, the flow metering device configured to close the radially extending port to restrict the fuel flow into the radially extending port at a low pressure operating condition and to open the radially extending port to increase the fuel flow at a high pressure operating condition; and an electronic control system operatively connected to the flow metering device, the electronic control system receiving a plurality of inputs comprising at least one of engine speed, fuel flow demand, fuel temperature, fuel pressure and ambient air conditions, the electronic control system controlling the flow metering device.

2. The dual stage fuel gear pump assembly of claim 1, wherein the flow metering device comprises a metering spool valve.

3. The dual stage fuel gear pump assembly of claim 1, wherein the flow metering device comprises a solenoid.

4. The dual stage fuel gear pump assembly of claim 1, wherein the flow metering device comprises a pneumatically controlled valve.

5. The dual stage fuel gear pump assembly of claim 1, wherein the flow metering device comprises a mechanically controlled valve.

6. The dual stage fuel gear pump assembly of claim 1, wherein the gear arrangement is part of a multi-stage gear arrangement.

7. The dual stage fuel gear pump assembly of claim 1, wherein the fuel flow is restricted during an engine starting operation.

8. The dual stage fuel gear pump assembly of claim 1, wherein the fuel flow is restricted during a windmill restart operation.

9. The dual stage fuel gear pump assembly of claim 1, wherein the flow metering assembly includes a tube in flow communication with the radially extending port of the pressure pad.

10. A method of managing fuel flow for an aircraft engine comprising:
    directing fuel flow through a dual stage fuel gear pump assembly for an aircraft engine, the dual stage fuel gear pump assembly including a gear arrangement having a plurality of gears disposed on a respective plurality of shafts including a drive gear disposed on a first shaft and a driven gear disposed on a second shaft, a bearing structure comprising a plurality of journal bearing, one bearing of the plurality of journal bearings operatively coupled to one shaft of the plurality of shafts and another bearing of the plurality of journal bearings operatively coupled to another shaft of the plurality of shafts, the plurality of journal bearings inserted into a common carrier to form an "8" shape, the one bearing configured to float against the one shaft and including:
    an annular inner surface and an annular outer surface,
    a pressure pad disposed on the annular inner surface adjacent the bearing structure, the pressure pad having a radially extending port for receiving a fuel flow, the radially extending port extending partially toward the annular outer surface to a radial location intermediate the annular inner surface and the annular outer surface;
    a flow metering device comprising a valve in fluid communication with the radially extending port of the pressure pad, the flow metering device configured to close the radially, extending port to restrict the fuel flow into the radially extending port at a low pressure operating condition and to open the radially extending port to increase the fuel flow at a high pressure operating condition;

regulating the fuel flow with the flow metering device, the fuel flow provided from a fuel supply to the radially extending port of the pressure pad disposed adjacent the bearing structure; and restricting the fuel flow with the flow metering device at low pressure operating condition by closing the radially extending port;

opening the port with the flow metering device to increase the fuel flow at the high pressure operating condition; and actively controlling the flow metering device with an electronic control system operatively connected to the flow metering device, the electronic control system receiving a plurality of inputs comprising at least one of engine speed, fuel flow demand, fuel temperature, fuel pressure and ambient air conditions.

11. The method of claim 10, wherein the low pressure operating condition comprises an engine starting operation.

12. The method of claim 10, wherein the low pressure operating condition comprises a windmill restart operation.

13. The method of claim 10, wherein the flow metering device comprises a metering spool valve.

14. The method of claim 10, wherein the flow metering device comprises a solenoid.

15. The method of claim 10, wherein the flow metering device comprises a pneumatically controlled valve.

16. The method of claim 10, wherein the flow metering device comprises a mechanically controlled valve.

17. The method of claim 10, wherein the flow metering assembly includes a tube in flow communication with the radially extending port of the pressure pad.

* * * * *